US009030857B2

(12) United States Patent
Martini et al.

(10) Patent No.: US 9,030,857 B2
(45) Date of Patent: May 12, 2015

(54) FIVE-STAGE NEUTRAL POINT CLAMPED INVERTER

(75) Inventors: David Martini, San Giovanni Valdarno (IT); Massimo Valiani, Corciano (IT); Simone Soldani, Levane (IT)

(73) Assignee: Power-One Italy S.p.A., Terranuova Bracciolini (IT)

( * ) Notice: Subject to any disclaimer, the term of this patent is extended or adjusted under 35 U.S.C. 154(b) by 0 days.

(21) Appl. No.: 13/642,456

(22) PCT Filed: Apr. 19, 2010

(86) PCT No.: PCT/IT2010/000169
§ 371 (c)(1),
(2), (4) Date: Dec. 18, 2012

(87) PCT Pub. No.: WO2011/132206
PCT Pub. Date: Oct. 27, 2011

(65) Prior Publication Data
US 2013/0094260 A1    Apr. 18, 2013

(51) Int. Cl.
*H02M 7/5387*    (2007.01)
*H02M 7/00*    (2006.01)
(Continued)

(52) U.S. Cl.
CPC .............. *H02M 7/483* (2013.01); *H02M 7/49* (2013.01)

(58) Field of Classification Search
CPC ........... H02M 7/42; H02M 7/44; H02M 7/48; H02M 7/483; H02M 7/487; H02M 7/537; H02M 7/5387
USPC ............. 363/16–17, 95–98, 131–132, 34–43, 363/101
See application file for complete search history.

(56) References Cited

U.S. PATENT DOCUMENTS 4,203,151 A * 5/1980 Baker ............................. 363/43
5,684,688 A * 11/1997 Rouaud et al. ................ 363/132
(Continued)

FOREIGN PATENT DOCUMENTS

DE    19945864 A1    10/2000
DE    10020537    12/2001
(Continued)

OTHER PUBLICATIONS

Rosas-Caro, J.C.; Ramirez, J.M.; Valderrabano, A., "Voltage balancing in DC/DC multilevel boost converters," Power Symposium, 2008. NAPS '08. 40th North American, vol., no., pp. 1,7, Sep. 28-30, 2008.*

(Continued)

*Primary Examiner* — Timothy J Dole
*Assistant Examiner* — Ivan Laboy Andino
(74) *Attorney, Agent, or Firm* — Patterson Intellectual Property Law, P.C.; Mark J. Patterson; Gary L. Montle

(57) ABSTRACT

The multi-level DC/AC converter, comprising: an input (5,7) connectable to a direct voltage source (3), with a first connection (5) and a second connection (7) between which can be applied an input voltage (Vi); a half-bridge with a first controlled switch (21) and a second controlled switch (25) between which is positioned an output (U) of the converter; a first connecting branch (15) between the first controlled switch (21) and the first connection (5) and a second connecting branch (17) between the second controlled switch (25) and the second connection (7); a third controlled switch (59) associated to the first controlled switch (21), connectable in series to the first controlled switch to generate an output voltage exceeding a first limit value (Vi/2); a fourth controlled switch (61) associated to the second controlled switch (25), connectable in series to said second controlled switch to generate an output voltage below a second limit value (−Vi/2).

8 Claims, 6 Drawing Sheets

(51) Int. Cl.
*H02M 7/483* (2007.01)
*H02M 7/49* (2007.01)

(56) References Cited

U.S. PATENT DOCUMENTS

| | | | | |
|---|---|---|---|---|
| 7,040,391 | B2* | 5/2006 | Leuthen et al. | 166/65.1 |
| 7,099,169 | B2* | 8/2006 | West et al. | 363/132 |
| 8,130,524 | B2* | 3/2012 | Lee et al. | 363/132 |
| 8,184,460 | B2* | 5/2012 | O'Brien et al. | 363/97 |
| 2010/0219692 | A1* | 9/2010 | Flury | 307/84 |
| 2011/0013438 | A1* | 1/2011 | Frisch et al. | 363/131 |
| 2011/0141779 | A1* | 6/2011 | Joseph | 363/95 |

FOREIGN PATENT DOCUMENTS

| | | |
|---|---|---|
| DE | 192996919684 | 9/2007 |
| EP | 2026457 | 2/2009 |
| JP | 2007028860 | 2/2007 |

OTHER PUBLICATIONS

Ashaibi, A.A.; Finney, S.J.; Williams, B.W.; Massoud, A.M., "Switched mode power supplies for charge-up, discharge and balancing dc-link capacitors of diode-clamped five-level inverter," Power Electronics, IET, vol. 3, No. 4, pp. 612,628, Jul. 2010.*

Yaosuo Xue; Manjrekar, M., "A new class of single-phase multilevel inverters," Power Electronics for Distributed Generation Systems (PEDG), 2010 2nd IEEE International Symposium on, vol., no., pp. 565,571, Jun. 16-18, 2010.*

Rodriguez, Jose: Multilevel Inverters: A Survey of Topologies, Controls, and Applications, IEEE Transactions on Industrial Electronics, Aug. 2002, vol. 49, No. 4, pp. 724-738, IEEE, XP 11073746A.

PCT/IT2010/000169 Search Report dated Jul. 9, 2012.

* cited by examiner

FIVE-STAGE NEUTRAL POINT CLAMPED INVERTER

TECHNICAL FIELD

The present invention relates to improvements to DC/AC converters and more specifically to multi-level PWM converters.

STATE OF THE ART

In many industrial applications, it is required to convert a direct current into alternating current at a predetermined voltage. For this purpose, DC/AC converters or inverters are used. Typical examples of uses of these circuits are found in the field of renewable energies or of alternative energies. Photovoltaic panels, for example, represent sources of direct electrical energy, which is used to supply power to local loads in alternating current, or which is injected into the normal AC electrical energy distribution grid. Other applications in the field of alternative energies contemplate the use of different types of direct current sources, e.g. wind generators, fuel cells, etc.

In general, the direct voltage generated by a photovoltaic panel, or another alternative source, is relatively low and not constant, because of the change in parameters, such as irradiation conditions, which may oscillate slowly and regularly because of the apparent movement of the sun, or rapidly and unpredictably because of transiting clouds and/or of the change in other climate parameters, such as humidity.

On the other hand, the electrical load or the electrical grid to which the source is interfaced through the converter requires alternating voltage power supply with a fixed, well determined frequency and peak value, typically a frequency of 50 or 60 Hz and a peak voltage of 220 V (in the case of single-phase line).

It is therefore necessary to provide DC/AC converters that are able to convert the electrical energy supplied by the direct voltage source into electrical energy with alternating voltage, with a peak value that is typically greater than the value of the direct voltage supplied by the source.

For this purpose, circuits have been designed that comprise a step-up converter interposed between the source and a half-bridge or full-bridge converter.

These circuits have a first drawback due to the complexity and to the cost deriving from the step-up stage. Moreover, the wave form of the voltage output from the converter has a high harmonic content and hence requires a very heavy output filter, with consequent additional costs.

Other known circuits (DE-A-10020537) employ a full-bridge converter connected, through three connections, to a pair of direct current sources connected in series. A chopping module or a DC/DC converter in parallel to the second source enables to generate a second level of voltage connecting the bridge alternatively to only one of the two sources, or to the terminals of the two sources in series. The chopping module is in conduction or interdiction depending on the value of the grid voltage. In this way, a reduced harmonic content of the voltage at the ends of the output inductance is obtained. The electronic switches of the bridge (designed as MOSFET, IGBT or other suitable components) are subject to a high voltage difference when the chopping module or the DC/DC converter is active and they switch at high voltage, with consequent high losses and need to be dimensioned for high voltage ratings.

DE-A-102006010694 describes an additional converter specifically devised for use in combination with photovoltaic panels, which uses a half-bridge structure. In parallel to the electronic switches of the half-bridge are positioned two branches containing a DC/DC converter and an electronic switch controlled as a function of the grid voltage. With this arrangement, the converter can generate five output voltage levels. The arrangement is such that the switches controlled by the two branches of the half-bridge and the two switches of the two branches positioned in parallel to the branches of the half-bridge must be designed for high voltage values, in such a way as to support the voltage of the highest level, with consequent costs and low efficiency because of the high switching losses.

SUMMARY OF THE INVENTION

According to one aspect, the invention provides a DC/AC converter that completely or partially overcomes one or more of the drawbacks of known converters.

Essentially, the invention provides a DC/AC converter with a half-bridge able to be connected at its input to a direct voltage source, wherein to the two controlled switches of the half-bridge are associated respective auxiliary switches that can be driven in such a way as to be inactive, when the output voltage is contained within a range of values around zero, within said range of values the output voltage being generated by driving the two switches of the half-bridge at an appropriate switching frequency, with a PWM driving signal with variable duty cycle, to obtain the gradual increase or the gradual decrease of the output voltage. The two switches are driven with complementary signals, so that when one of the switches is closed the other one is open and vice versa. Vice versa, when an output voltage needs to be generated with a value outside this range of limit values, the two switches of the half-bridge are driven, as a function of the sign of the output voltage, in such a way that one of them is constantly in conduction and in series with one of the auxiliary switches which is vice versa driven with a PWM signal at an appropriate switching frequency and with a variable duty cycle. The sign of the output voltage determines which of the two switches of the half-bridge is kept in continuous conduction and which auxiliary switch is placed in series to it and driven by the PWM signal. Voltage regulators are associated to the auxiliary switches, so that the output voltage can gradually assume positive values above the upper limit value of the aforesaid range, or negative values gradually lower than the lower limit value of said range.

In practice, the portions of the positive and negative half-wave of the output voltage are generated using a series arrangement of switches: depending on the sign of the output voltage, one or the other of the switches of the half-bridge are used in conditions of continuous conduction (always closed) in series with the corresponding auxiliary switch driven with a chopping PWM signal. The voltage rate of the auxiliary switches is thus limited, with a series of advantages that shall be made more readily apparent below.

This concept can be expanded providing more than one auxiliary switch for each of the switches of the half-bridge with the possibility of arranging more than two switches in series depending on the value of the output voltage to be generated, thereby obtaining a converter with a higher number of voltage levels and hence with a reduced harmonic content of the output voltage.

The converter according to the invention enables to obtain a plurality of voltage levels, thereby allowing a reduction of the harmonic content of the output sinusoidal voltage. Moreover, circuit advantages are obtained in terms of reducing losses and reducing component costs.

In some embodiments, the invention provides a DC/AC converter comprising: an input connectable to a source of direct voltage; a half-bridge with a first controlled switch and a second controlled switch; connecting branches between the half-bridge and the connections to the direct voltage source; a third controlled switch associated to the first controlled switch of the half-bridge, connectable in series to said first controlled switch to generate an output voltage exceeding a first limit value; a fourth controlled switch associated to said second controlled switch, connectable in series to the second controlled switch to generate an output voltage below a second limit value.

In advantageous embodiments of the invention, the converter further comprises: a first voltage regulator positioned to regulate the voltage across a first capacitor; a second voltage regulator positioned to regulate the voltage across a second capacitor. The third controlled switch is connected between a first plate of the first capacitor and the first controlled switch of the half-bridge, whilst the fourth controlled switch is connected between a first plate of the second capacitor and the second controlled switch of the half-bridge.

In one embodiment, the invention provides a multi-level DC/AC converter, comprising:

an input connectable to a direct voltage source, with a first connection and a second connection across which an input voltage can be applied, a neutral being positioned between the first and the second connection;

a half-bridge with a first controlled switch and a second controlled switch between which an output of the converter is positioned;

a first connecting branch between the first controlled switch and the first connection and a second connecting branch between the second controlled switch and the second connection;

a first voltage regulator positioned to regulate voltage across a first capacitor;

a second voltage regulator positioned to regulate voltage across a second capacitor;

a third controlled switch connected between a first plate of the first capacitor and the first controlled switch;

a fourth controlled switch connected between a first plate of the second capacitor and the second controlled switch.

In some embodiments between the first and the second connection, between which is applied the source of direct voltage, a pair of capacitors are positioned in series, between which the neutral of the circuit is arranged.

Some advantageous embodiments provide that: the first controlled switch and the third controlled switch are connected to a second plate of the first capacitor through the first connecting branch; and the second controlled switch and the fourth controlled switch are connected to a second plate of the second capacitor through the second connecting branch.

In some embodiments the first, second, third and fourth controlled switch are driven in such a way that:

the output voltages between a positive limit value and a negative limit value are generated switching said first and said second controlled switch at a switching frequency, maintaining the third and the fourth controlled switch constantly open;

output voltages above said positive limit value are generated switching the third controlled switch at a switching frequency and maintaining said first controlled switch constantly in conduction;

output voltages below said negative limit value are generated switching the fourth controlled switch at a switching frequency maintaining said second controlled switch constantly in conduction;

Further advantageous features and embodiment of the converter according to the invention are set forth in the appended claims, which are an integral part of the present disclosure.

BRIEF DESCRIPTION OF THE DRAWINGS

The invention shall be better understood by following the description and accompanying drawing, wherein.

DETAILED DESCRIPTION OF EMBODIMENTS OF THE INVENTION

Figure 1:
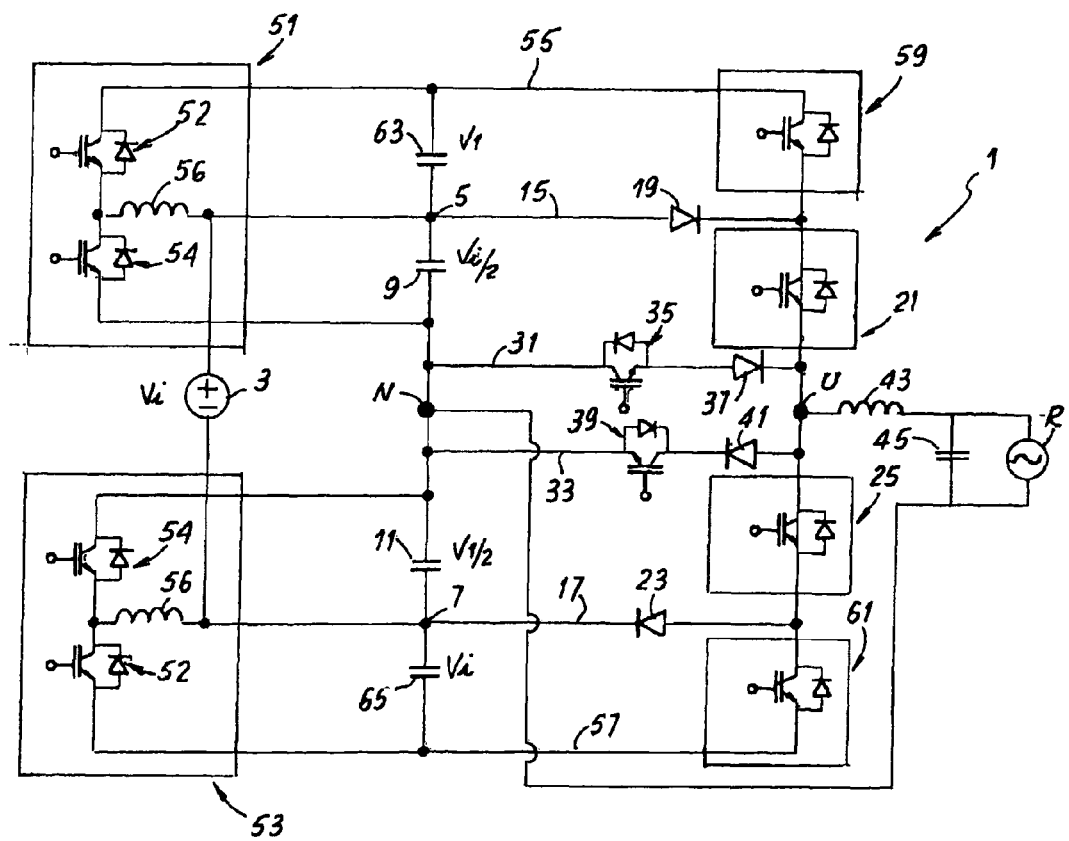
FIG. 1 show a diagram of a first embodiment of a converter according to the invention.

FIG. 1 shows a first circuit diagram of a converter according to the invention, indicated as a whole with reference number 1. Reference number 3 indicates a direct voltage source, e.g. a group of photovoltaic panels, which supplies an input voltage Vi. The source 3 is connected to two input connections 5 and 7 of the converter 1. More in particular, in the diagram of FIG. 1 the positive pole of the source 3 is connected to the connection 5 and the negative pole of the source 3 is connected to the connection 7.

Reference numbers 9 and 11 indicate two capacitors connected respectively between the connection 5 and the neutral N and between the connection 7 and the neutral N of the converter 1. The voltage Vi of the source 3 is split at the ends of the two capacitors 9 and 11, across the plates of each capacitor being present a voltage difference of Vi/2. Therefore, the input voltage of the converter 1, referred to the neutral N, is Vi/2.

To the connections 5 and 7 a half-bridge is connected, which comprises a first branch 15 connected between the connection 5 and the output U of the converter 1 and a second branch 17 connected between the connection 7 and the output U. The first branch comprises a diode 19 and a controlled electronic switch 21, e.g. a MOSFET or an IGBT, arranged in series. The switch 21 comprises an internal diode illustrated schematically in the drawing. The second branch 17 comprises a diode 23 and a second controlled electronic switch 25, e.g. a MOSFET with its own internal diode. The centre of the half-bridge is connected with two clamp connections 31 and 33 to the neutral N. Each of the two connections 31 and 33 comprises a controlled electronic switch, e.g. a MOSFET or an IGBT and a diode, indicated by the references 35 and 37 for the branch 31 and by the references 39 and 41 for the branch 33.

To the centre or output U of the half-bridge are connected a filtering inductance 43 and a filtering capacitor 45. In the illustrated example, the converter is connected to an electrical energy distribution grid, schematically indicated with reference R, connected between the LC-filter formed by the inductance 43 and by the capacitor 45 and the neutral N of the converter 1. In this way, the electrical energy supplied by the direct current source 3 is converted into alternating electrical energy at the grid frequency and injected onto the grid itself, in phase with the grid voltage. Alternatively, the converter 1 can be connected to a load that is powered (fully or partially, always or only in determined period) by the electrical energy directly supplied by the source 3. For the purposes of the description of the invention, it is irrelevant whether the converter 1 supplies power to a load or supplies energy to the distribution grid. Therefore, hereafter reference shall, be made to this second possibility.

The structure described so far is known in itself.

Grid voltage oscillates sinusoidally and reaches peak values that are typically greater than the value Vi/2. Hence, it is necessary that the converter 1 be able to boost the voltage to a sufficient value to have an output voltage that reaches the grid voltage values.

For this purpose, the converter 1 comprises two voltage regulators 51 and 53 connected to the neutral N and each to a respective branch 55, 57 in parallel to the branches 15 and 17 of the half-bridge. The branch 55 comprises a controlled switch 59, e.g. a MOSFET or an IGBT represented with its internal diode. The branch 57 comprises a controlled switch 61 similar to the switch 59. A corresponding capacitor 63, 65 is positioned in parallel to each switch 59 and 61. The capacitor 63 is connected between the branch 55 and the connection 5, whilst the capacitor 65 is connected between the branch 57 and the connection 7. Moreover, a first plate of the capacitor 63 is connected, through the branch 55, to one end of the switch 59, whilst a second plate of the capacitor 63 is connected through the branch 15 to a connecting point between the switches 59 and 21. A similar connection is provided for the capacitor 65, a first plate whereof is connected through the branch 57 to one end of the switch 61, whilst a second plate is connected through the branch 17 to a connecting point between the switches 25 and 61.

In the example shown, each voltage regulator 51, 53 comprises two controlled electronic switches 52, 54 in series, connected to the neutral and to the branch 55, or to the branch 57. The central point between the two switches 52, 54 of each voltage regulator 51, 53 is connected to a respective inductance 56, whose second terminal is connected to the connection 5 for the voltage regulator 51 and to the connection 7 for the voltage regulator 53.

The voltage regulators 51 and 53 are controlled in such a way as to generate a voltage V1 across the respective capacitors 63 and 65. In this way, the voltage between the branch 55 and the neutral is (Vi/2+V1), whilst the voltage between the branch 57 and the neutral is −(Vi/2+V1). Hence, the circuit is able to generate on the output U, i.e. at the central point of the half-bridge, five levels of voltage equal to 0, Vi/2, (Vi/2+V1), −(Vi/2+V1).

Operation of the circuit described above is as follows.

The switches 35, 39 can be controlled to switch at the grid frequency, e.g. 50 Hz as a function of the sign of the output voltage. More in particular, switches 35, 39 are controlled in such a way that the switch 35 is closed and the switch 39 is open in the positive half wave of the output voltage, whilst the switch 39 is closed and the switch 35 is open in the negative half wave of the output voltage.

Figure 2:
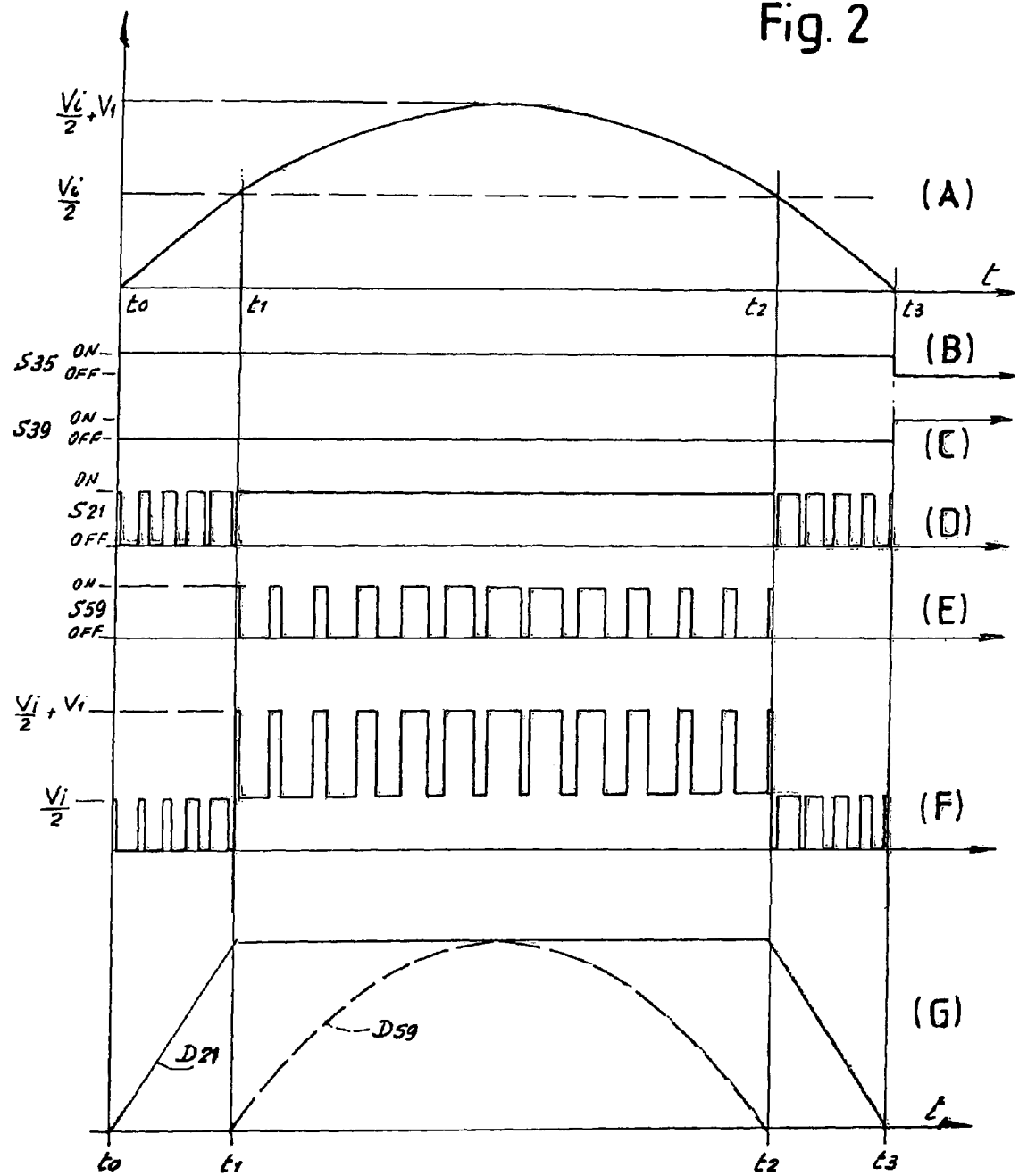
FIGS. 2A-2G show wave forms of driving circuits of the circuit of FIG. 1.

The switches 21, 25, 59, 61 are controlled to switch at high frequency, e.g. 15 kHz by means of a PWM signal with a duty cycle which is variable according to a control logic that will be described below with reference to FIGS. 2 and 3. Reference shall be made, hereafter, to a converter 1 applied to the electrical distribution grid to which the converter transfers electrical energy supplied by the source 3 and in which output current and output voltage are in phase. However, the following considerations also apply if the converter 1 is connected to a load and if this load introduces a voltage and current phase shift.

FIG. 2A shows a positive half wave of the grid voltage. t0 indicates the zero-crossing point, t1 the instant in which the grid voltage reaches the value Vi/2, t2 the instant in which the grid voltage after reaching the peak value passes through the value Vi/2 again and t3 the subsequent zero-crossing instant.

FIGS. 2B and 2C show the driving signal S35 and S39 respectively of the switches 35 and 39 as a function of the output voltage. The signal S35 is high (switch 39 closed) throughout the time interval [t0-t3], whilst the signal S39 is low (switch 39 open). During the negative half wave the situation is reversed: S35 is low (switch 35 open) whilst the signal S39 is high (switch 39 closed).

In the time interval [t0-t1], since the output voltage is lower than Vi/2, the current is transferred to the output through the switch 21, whilst the switch 59 remains open. To generate an output voltage that follows the sinusoidal grid pattern, the switch 21 is driven with a driving signal S21 (FIG. 2D), whose duty cycle changes from 0 to 1 (FIG. 2G). The current entirely flows through the diode 19 whilst the branch 55 is not traversed by the current. During the opening intervals (Toff) of the switch 21 the current flows through the branch 31 and the diode 37.

When the grid voltage reaches the value Vi/2, i.e. the voltage across capacitor 9, it is necessary to supply a greater output voltage. For this purpose, the switch 21 that until the instant t1 was choppered with the variable duty cycle signal S21, is kept in fixed conduction, whilst the switch 59, which until this point had remained open, is driven with a driving signal S59 with variable duty cycle D59, as shown in FIGS. 2E and 2G. The change from 0 to 1 of the duty cycle D59 of the driving signal S59 of the switch 59 allows to generate a voltage output that follows the pattern of the grid voltage for the time interval [t1-t2]. The current flows completely in the branch 55 and through the switches 59 and 21, which are connected in series, during the conduction intervals (Ton) of the switch 59, whilst it flows through the branch 15 and the diode 19 during the opening intervals (Toff) of the switch 59.

When the grid voltage reaches the value Vi/2 at the instant t2 and starts to drop below it, the switch 59 is maintained open and the switch 21 starts to be choppered by the signal S21 with a duty cycle D21 again variable from 1 to 0.

FIG. 2F shows the waveform of the output voltage Vu that is obtained with the driving described above.

A symmetric situation occurs in the negative voltage half wave, in which the output voltage values between 0 and −Vi/2 are generated driving the switch 25 with a PWM signal with variable duty cycle, whilst the switch 61 remains open. To generate output voltage values below −Vi/2, the switch 25 is constantly maintained in conduction, whilst the switch 61 is driven with a PWM driving signal with variable duty cycle and, hence, it is in series with the switch 25.

Figure 3:
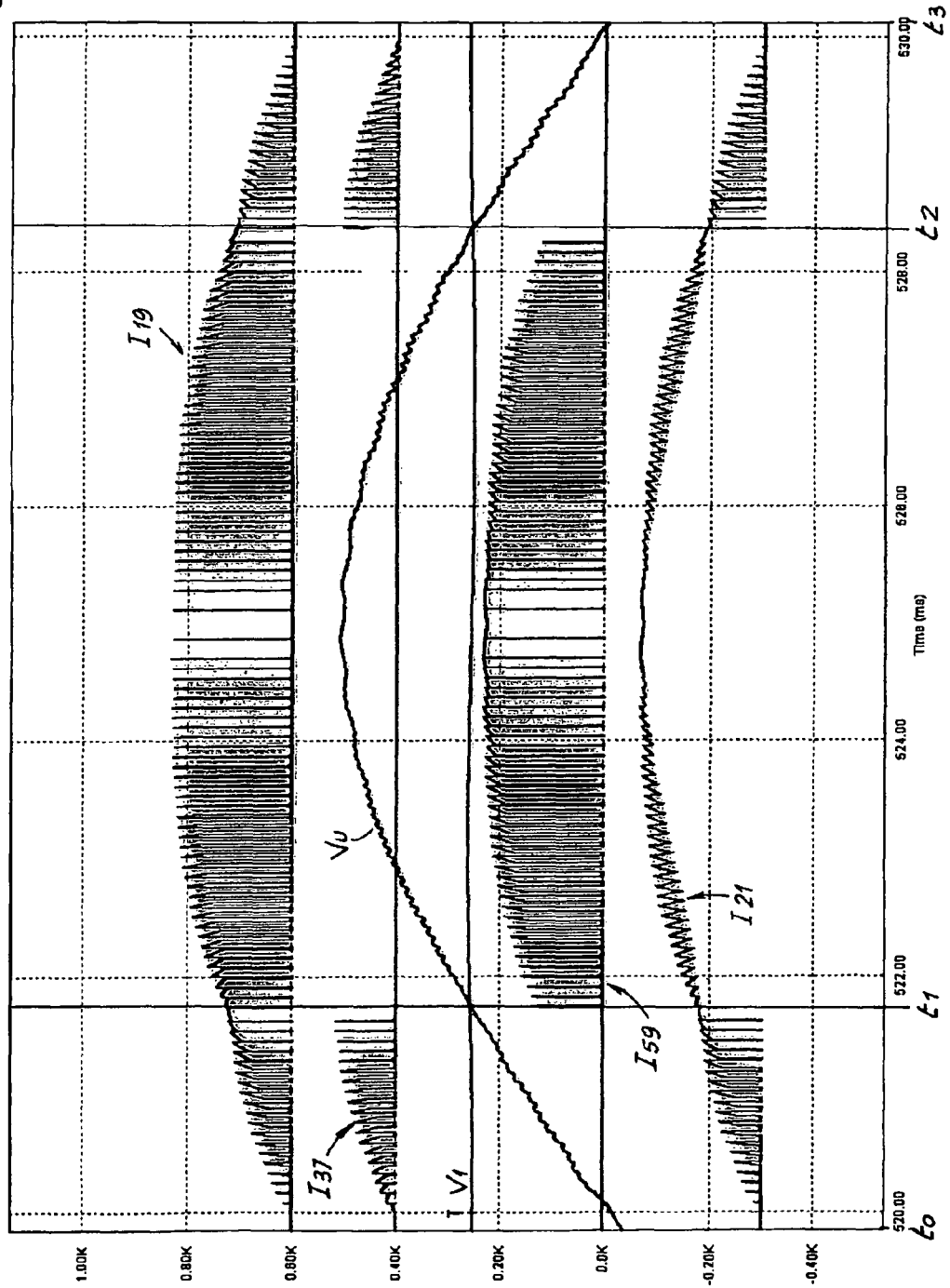
FIG. 3 show diagrams of the currents and voltages in the circuit of FIG. 1.

The curves of FIG. 3 show the corresponding wave forms of the current. Since in the example shown voltage and current are in phase, the pattern of the current matches the pattern of the voltage. In particular, FIG. 3 shows: the pattern of the current 119 through the branch 15 and the diode 19, the current 137 through the branch 31 and the diode 37, the current 159 through the switch 59, the voltage V1 across the capacitor 63 and the output voltage Vu. As is readily apparent from the aforesaid curves, during the intervals [t0-t1] and [t2-t3] the current circulates through the branch 15, the diode 19 and the switch 21 in the ON phase of the duty cycle of the switch 21, and through the branch 31 and the diode 37 in the OFF phase of the duty cycle. In the interval [t1-t2] the current circulates in the branch 55, in the switch 59 and in the switch 21 in the ON phase of the duty cycle of the switch 59 and through the branch 31 and through the branch 15 and the diode 19 in the OFF phase of the duty cycle of the switch 59.

From the above description, it is clear that during the interval [t1-t2] in which the output voltage exceeds the value Vi/2 the two switches 59, 21 work in series and the switch 59 must withstand a voltage of V1 across its terminals, instead of the entire voltage (V1+Vi/2). Consequently, this switch can be dimensioned with a lower voltage rating than the switch 21 that, vice versa, must withstand a voltage of (V1+Vi/2) across its terminals.

Since during the negative half wave of the grid voltage there is a mirror-like situation for the switches 25 and 61, the same considerations hold true for these two additional components.

From the above description, it is readily apparent that since the switches 59 and 61 must have a lower voltage rating than the switches 21 and 25, their cost is lower than the switches 21 and 25. This enables to obtain a first advantage over known circuits in which the switches of the half-bridge are connected in parallel and hence both must be dimensioned with a voltage rating at the maximum value of the voltage applied at the ends of the half-bridge.

Moreover, since the switching losses are the greater, the greater the voltage across the switch terminals, it is clear that during the time interval [t1-t2] where the switch 21 is not switched, but instead it remains constantly in conduction, whilst the switch 59 is choppered, the switching losses will be a function of a voltage V1 instead of (V1+Vi/2) and hence far lower. Since within the half wave the interval [t1-t2] longer than half of the half wave, this entails a substantial advantage in terms of switching losses reduction. Not only are the higher losses limited to the intervals [t0-t1] and [t2-t3], but the sum of these intervals is less than [t1-t2].

The same considerations apply in mirror-like manner for the switches 25 and 61.

In the final analysis, with a converter like the one shown in FIG. 1 a high number of voltage levels is obtained, in the specific case five levels equal to:

$-(V1+Vi/2);-Vi/2;0;Vi/2;(V1+Vi/2)$ which allows to have a low harmonic content in the output voltage with a relatively light LC filter. Moreover, contrary to other known circuit solutions that provide the same level of output voltage, a substantial saving is obtained in terms of components cost and an efficient reduction of the switching losses.

Figure 4:
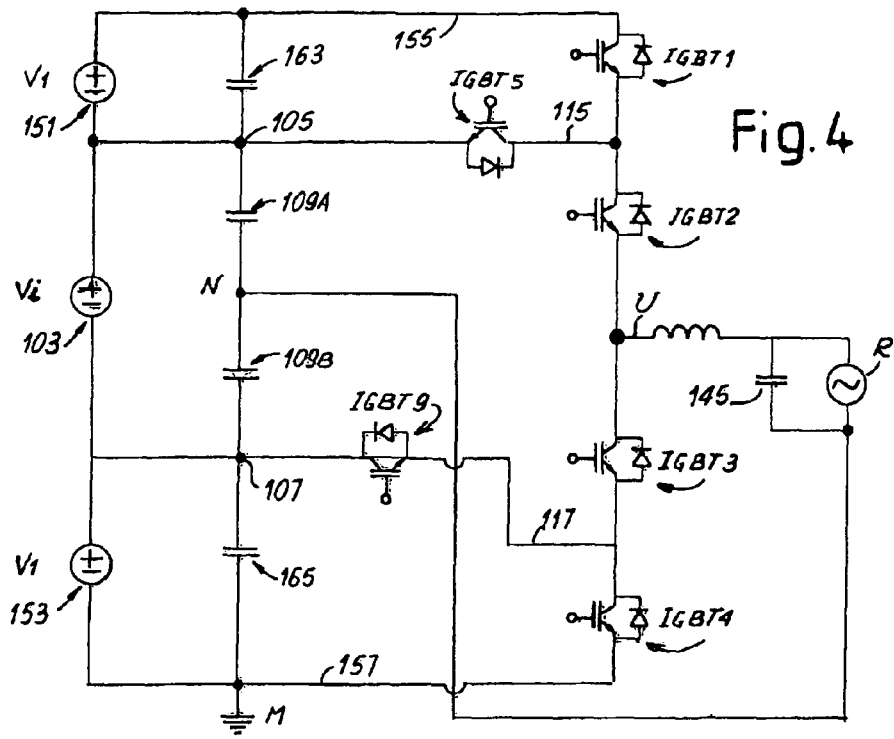
FIG. 4 show a diagram of a second embodiment of a converter according to the invention.

FIG. 4 shows an additional embodiment of a circuit according to the invention, which enables to obtain, in addition to the advantages already mentioned, a reduction in the number of components as well.

More in particular, FIG. 4 shows a converter 101 connected through connections 105 and 107 to a direct voltage source 103. The reference letter M indicates earth and the letter U indicates the output of the converter 101. Between the connections 105 and 107 are positioned a pair of capacitors 109A, 109B and a half-bridge comprising a first branch 115, connected between the connection 105 and the output U of the converter 101, and a second branch 117, connected between the connection, 107 and the output U. The first branch 115 comprises a controlled electronic switch indicated with IGBT5 and an additional controlled electronic switch indicated with the reference IGBT2. Instead of IGBT, the switches can, for example, be constituted by MOSFET. The switches IGBT5 and IGBT2 are positioned in series between the connection 105 and the output U. Both switches comprise a respective internal diode schematically shown in the drawing.

A second branch 117 comprises a controlled electronic switch IGBT9 and an additional controlled electronic switch IGBT3, each with its own internal diode as shown in the diagram of FIG. 4.

To the centre or output U of the half-bridge are connected a filter inductance 143 and a filter capacitor 145. In the example shown, the converter is connected to an electrical energy distribution grid, schematically indicated with the reference R. In this way, the electrical energy supplied by the direct current source 103 is converted into alternating electrical energy at the grid frequency and injected onto the said grid, in phase with the grid voltage. Alternatively, the converter 101 can be connected to a load that is powered by the electrical energy supplied by the source 103.

The converter 101 further comprises two voltage regulators 151 and 153 connected respectively to the connections 105, 107 and each to a respective branch 155, 157 in parallel to the branches 115 and 117 of the half-bridge. The branch 155 comprises a controlled switch IGBT1, represented with its internal diode. The branch 157 comprises a controlled switch IGBT4 similar to the switch 159. In parallel to each switch IGBT1 and IGBT4 is positioned a respective capacitor 163, 165. The capacitor 163 is connected between the branch 155 and the connection 105, whilst the capacitor 165 is connected between the branch 157 and the connection 107. The voltage regulators can have a construction similar to that described with reference to FIG. 1.

The source 103 and the voltage regulators 151 and 153 generate four voltage levels which, referred to the earth M, have the following values: 0, V1, Vi/2+V1, Vi across the ends of each capacitor 109A, 109B, 163, 165.

Figure 5:
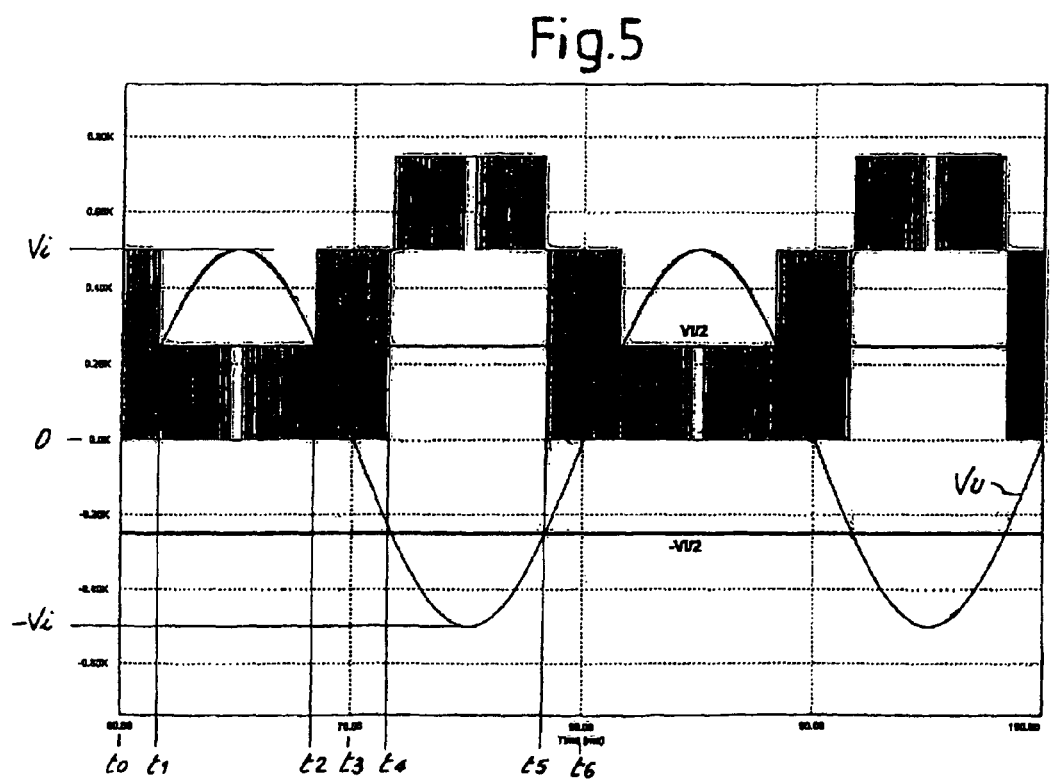
FIG. 5 show the diagram of the wave form of the output voltage in the circuit of FIG. 4.
Figure 6:
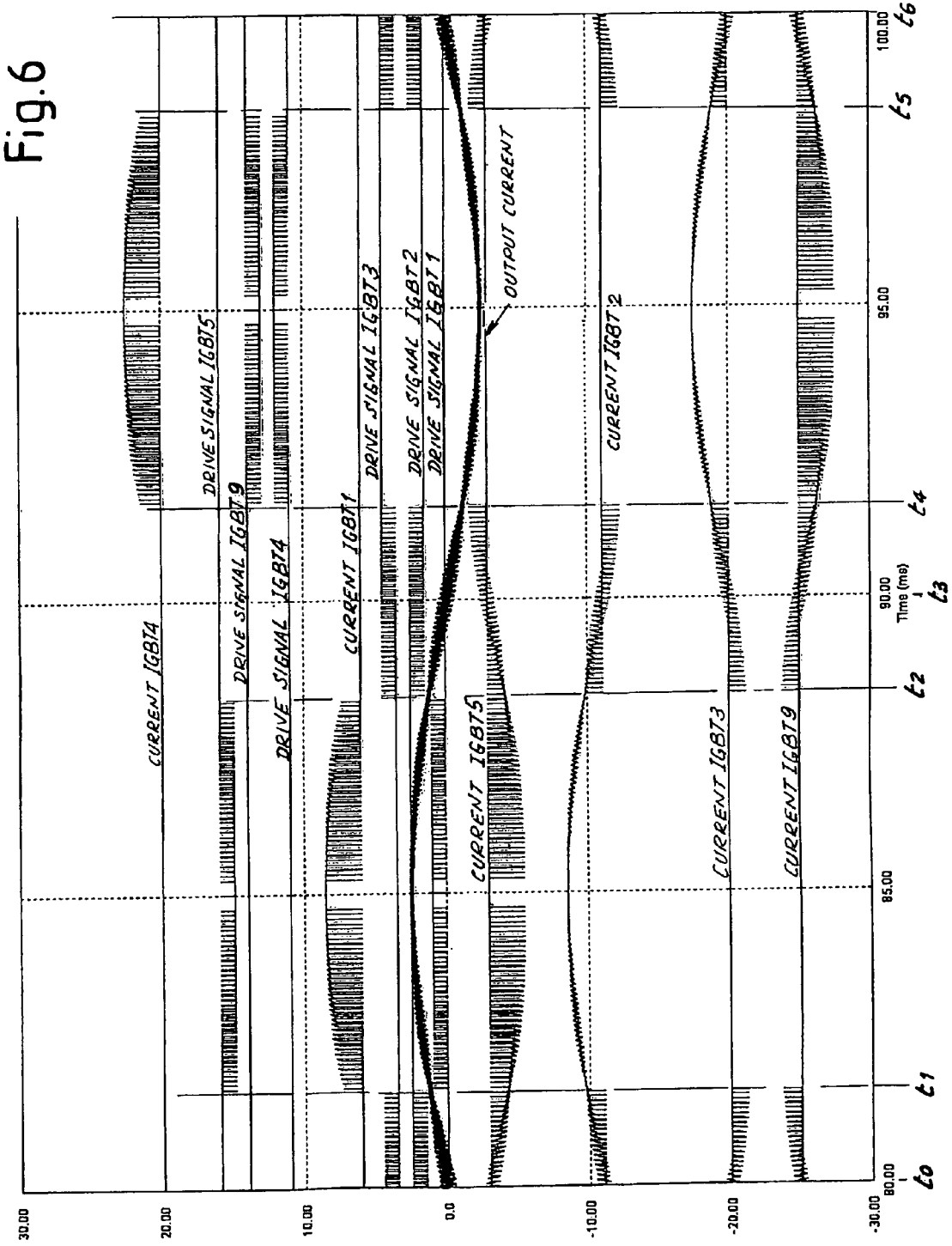
FIG. 6 show a diagram with the wave forms of the currents and of the driving signals of the controlled switches of the circuit of FIG. 4.
Figure 7:
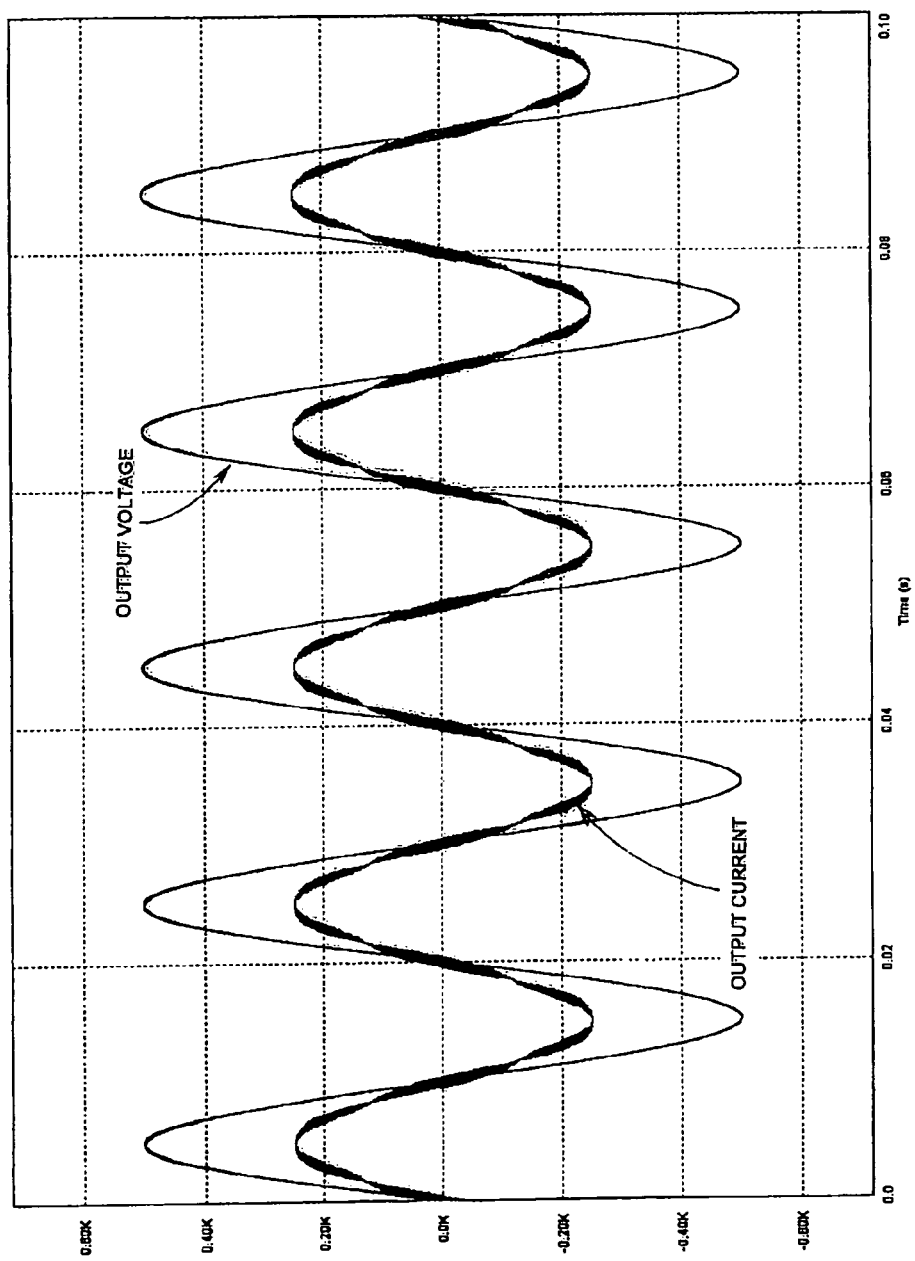
FIG. 7 show a diagram showing the output current and voltage of the circuit of FIG. 4 if there is no phase displacement.

The operation of the circuit is described hereafter with reference to the diagrams of FIGS. 5, 6 and 7. FIG. 5 shows the waveform of the output voltage between the points U and N of the circuit of FIG. 4. Voltage has a substantially sinusoidal pattern which is generated by appropriately switching the switches IGBT1, IGBT2, IGBT3, IGBT4, IGBT5, IGBT9. FIG. 6 shows the driving signals and the currents in the various components of the circuit and FIG. 7 shows the waveform of the voltage and of the current which, in the illustrated example, are in phase.

As in the case of the circuit of FIG. 1, the switches IGBT2 and IGBT3 are dimensioned for a higher voltage rating, above Vi/2, where Vi is the voltage across the ends of the connections 105 and 107, whilst switches IGBT1 and IGBT3 are dimensioned for a lower voltage rating, achieving similar advantages to those described with reference to the example of FIG. 1.

With reference to FIG. 5, one can observe that the output voltage Vu (between U and N) has a sinusoidal pattern oscillating between a maximum and a minimum that in the example shown have values Vi and −Vi respectively. The chart also shows the values Vi/2 e−Vi/2 of the voltage at the connections 105 and 107. During the positive half wave, the output voltage Vu grows from 0 to Vi/2 in the time interval t0-t1; in the time interval t1-t2 grows from Vi/2 to the maximum value (indicated by way of example with the reference Vi) and then drops to Vi/2. In the interval t2-t3, it drops from Vi/2 to 0. In the negative half wave, there is a symmetrical behaviour with reversed signs: in the interval t3-t4 the voltage drops from 0 to −Vi/2. In the interval t4-t5 it drops to the minimum value Vi and then rises to the value −Vi/2. In the interval t5-t6 it rises until it reaches the value 0 again.

In the illustrated hypothesis, with output current and voltage in phase, in the intervals t0-t1 and t2-t3 the current flows in the switches IGBT5, IGBT2, IGBT3 and IGBT9. In the interval t1-t2 the current flows in the switches IGBT1, IGBT5, and IGBT2. In the intervals t3-t4 and t5-t6 the current flows in the switches IGBT5, IGBT2, IGBT3 and IGBT9. Lastly, in the interval t4-t5 the current flows in the switches IGBT9, ITBT3, and IGBT4.

With reference to the wave forms of FIG. 6, the current and of the voltage waveforms during a cycle of the output sinusoidal voltage shall now be described in greater detail. In the described example, it is also assumed that the output voltage and current are in phase, although this is not necessary and it does not occur for example if the circuit is connected to a reactive load, instead of to an electrical distribution grid or to a resistive load.

On the x-axis of the diagram in FIG. 6 are shown the time instants t1, t2, t3, t4, t5 and t6 corresponding to the instants t1, . . . t6 into which was subdivided the period of the output sinusoidal voltage represented in the diagram of FIG. 5. The diagram in FIG. 6 shows:
the output current (in phase with the output voltage, FIG. 7);
the currents in each of the switches IGTB1, IGTB2, IGBT3, IGBT4, IGBT5, IGBT9;
the driving signals of the switches IGTB1, IGTB2, IGBT3, IGBT4, IGBT5, IGBT9.

The currents and the driving signals of the switches are the following:

In the time interval t0-t1, whilst the output voltage rises from a value 0 to a value Vi/2, and the current (under the assumptions made with respect to the output load) follows the pattern of the voltage, the switch IGBT1 is open (driving signal at 0), the switch IGBT2 is driven and switches at a frequency, e.g. 15 kHz; the switch IGBT3 is driven and switches complementarily to IGBT2, i.e. when the switch IGBT2 is closed, the switch IGBT3 is open and vice versa. The duty cycle of the switch IGBT2 gradually increases from 0 to 1, whilst correspondingly the duty cycle of the switch IGBT3 decreases from 1 to 0. The switch IGBT4 is open. The switches IGBT5 and IGBT9 are constantly closed (driving signals fixedly set to the value 1). In the closing time interval (Ton) of the switch IGBT2 the current flows through the switches IGBT5 and IGBT2 (more specifically in the internal diode thereof), whilst during the opening interval (Toff) of the switch IGBT2 the current flows through the switches IGBT0 and IGBT3 (more specifically in the internal diode thereof). Across the terminals of the switch IGBT2 there is a voltage difference of Vi.

In the interval t2-t3, whilst the voltage rises above the value Vi/2, the switch IGBT1 switches at a frequency, for example, of 15 kHz with a growing duty cycle. The switch IGBT2 is constantly closed, the switch IGBT3 is constantly open and the switch IGBT5 switches in complementary fashion to the switch IGBT1. The switches IGBT9 and IGBT4 can assume any condition, since the switch IGBT3 is open. In the illustrated example, the switch IGBT9 is closed and the switch IGBT4 is open. As a consequence of the state of the switches, the current flows through the switch IGBT1 in the on interval (Ton) of the duty cycle, whilst in the off interval (Toff) of this switch the current flows through the switch IGBT5. As an effect of the gradual duty cycle increase of the switch IGBT1 from the instant t1 for a period of (t2-t1)/2 there is a gradual increase of the output current. Subsequently, from the intermediate instant of the interval t1-t2 until the instant t2 there is a gradual reduction of the duty cycle of the switch IGBT1, i.e. of its on time (Ton) and a complementary increase of the duty cycle of the switch IGBT5.

In the subsequent interval t2-t3 there is a similar condition to that of the interval t0-t1, but with a gradual reduction of the conduction time (i.e. of the duty cycle) of the switch IGBT2 and a consequent complementary gradual increase of the duty cycle of the switch IGBT3.

In the interval t3-t6 of the negative half wave of the output current and voltage (assuming, as stated above, that current and voltage are in phase), there is a complementary situation to the one described above.

More in particular, in the interval t3-t4 the switch IGBT1 is open (driving signal at zero). The switch IGBT2 is driven and it switches at a frequency, e.g. 15 kHz, complementarily to the switch IGBT3: i.e. when the switch IGBT2 is closed, the switch IGBT3 is open and vice versa. The duty cycle of the switch IGBT2 gradually decreases, whilst correspondingly the duty cycle of the switch IGBT3 increases. The switch IGBT1 is open, the switch IGBT5 and the switch IGBT9 are constantly closed.

The current flows through the switches IGBT9 and IGBT3 during the closure phase (Ton of the duty cycle) of the switch IGBT3, whilst it flows through the switches IGBT5 and IGBT2 during the opening interval (Toff of the duty cycle) of the switch IGBT3 and the closing interval (Ton of the duty cycle) of the switch IGBT2.

When at instant t4 the voltage reaches the value −Vi/2, the state of the switches changes. For the interval t4-t5 the switch IGBT2 remains open. The switches IGBT1 and IGBT5 are driven complementarily and in the illustrated example the switch IGBT1 is constantly maintained open whilst the switch IGBT5 is constantly maintained closed. The switch IGBT3 constantly remains in conduction (driving signal at 1), the switch IGBT4 switches at high frequency (e.g. 15 kHz) with a variable duty cycle and the switch IGBT9 switches complementarily to the switch IGBT4. The duty cycle of the switch IGBT4 increases gradually until the minimum voltage is reached and then decreases, whilst the duty cycle of the switch IGBT9 follows a complementary pattern.

Current flows constantly through the switch IGBT3 and alternatively through the switch IGBT9 and IGBT4 at the respective conduction intervals, driven complementarily.

In the interval t5-t6 the state of the switches returns to being that of the interval t3-t4, but with a gradual increase of the conduction time (i.e. the duty cycle) of the switch IGBT3 and a gradual corresponding decrease of the conduction time (i.e. the duty cycle) of the switch IGBT4.

As in the case of the circuit of FIG. 1, the series arrangement of the switches IGBT1, IGBT2 and IGBT3, IGBT4 enables to have a particularly favorable condition in terms of reduction of the switching losses by effect of the lower voltage rating on the switches IGBT1 and IGBT5, with respect to what takes place in other topologies of multi-level DC/AC converters known in the art.

The advantage is particularly significant considering that the switching time of these switches (t1-t2 for IGBT1 in the positive half wave and t4-t5 for IGBT4 in the negative half wave) is longer than the switching time of the switches IGBT2 and IGBT3.

It must be understood that the concept whereon the circuits of FIGS. 1 and 4 are designed can also be extended to a configuration with a higher number of voltage levels, since the structure of the circuit is modular.

It is understood that the drawing only shows an example provided by way of a practical demonstration of the invention, which can vary in forms and arrangements without however departing from the scope of the concept underlying the invention. Any reference numerals in the appended claims are provided to facilitate reading of the claims with reference to the description and to the drawing, and do not limit the scope of protection represented by the claims.

The invention claimed is:

1. A multi-level DC/AC converter for converting a variable input DC voltage into an AC output voltage with fixed positive and negative peak values, the converter comprising:
   an input comprising a first connection and a second connection, an input voltage across which defines first and second limit values with respect to a neutral terminal;
   first, second, third, fourth, fifth and sixth connecting branches arranged in parallel, the second connecting branch coupled to the first input connection and the fifth connecting branch coupled to the second input connection;
   first, second, third and fourth capacitors coupled in series,
      the first capacitor coupled on a first end to the first connecting branch;
      the first and second capacitors coupled together at the first input connection and the second connecting branch,
      the second and third capacitors coupled together at a neutral node and further to the third and fourth connecting branches,
      the third capacitor and a first end of the fourth capacitor coupled together at the second input connection and the fifth connecting branch,
      a second end of the fourth capacitor coupled to the sixth connecting branch;
   first, second, third and fourth controlled switches coupled in series,
      the first controlled switch coupled on a first end to the first connecting branch;
      the first and second controlled switches coupled together at the second connecting branch,
      the second and third controlled switches coupled together at an output node of the converter and further to the third and fourth connecting branches,
      the third controlled switch and a first end of the fourth controlled switch coupled together at the fifth connecting branch,
      a second end of the fourth controlled switch coupled to the sixth connecting branch;
   a first voltage regulator configured to generate a voltage across the first capacitor corresponding to a difference between the fixed positive peak value and the first limit value; and
   a second voltage regulator configured to generate a voltage across the fourth capacitor corresponding to a difference between the fixed negative peak value and the second limit value.

2. The converter of claim 1, wherein:
   the first voltage regulator comprises fifth and sixth controlled switches coupled in series across the first end of the first capacitor and the neutral, and an inductance coupled on a first end to a node between the fifth and sixth controlled switches and on a second end to the first input connection; and
   the second voltage regulator comprises seventh and eighth controlled switches coupled in series across the second end of the fourth capacitor and the neutral, and an inductance coupled on a first end to a node between the seventh and eighth controlled switches and on a second end to the second input connection.

3. The converter of claim 2, wherein:
   the third connecting branch comprises a first clamping circuit;
   the fourth connecting branch comprises a second clamping circuit; and
   the first and second clamping circuits each comprising a respective first clamp switch and a second clamp switch in series to a respective first diode and second diode, the clamp switches and the diodes of the first and second clamping circuits being arranged in antiparallel.

4. The converter of claim 3, wherein the first and second clamp switches are driven as a function of the sign of the output voltage, the first clamp switch being in conduction and the second clamp switch being open in the negative half wave of the output voltage, the first clamp switch being open and the second clamp switch being in conduction in the positive half wave of the output voltage.

5. The converter of claim 1, wherein the first limit value comprises a positive limit value and the second limit value comprises a negative limit value, and wherein responsive to a variable input voltage being provided from a direct voltage source across the first and second connections the first, second, third and fourth controlled switch are driven by PWM driving signals having variable duty cycle in such a way that:
   output voltage values between the first limit value and the second limit value are generated by switching the second and third controlled switches complementarily while the first and fourth controlled switches are kept open;
   output voltage values exceeding the first limit value are generated switching the first controlled switch, while the second controlled switch is kept closed and the third controlled switch is kept open; and
   output voltage values below the second limit value are generated switching the fourth controlled switch, maintaining the third controlled switch closed and the second controlled switch open.

6. The converter of claim 1, wherein a variable output voltage from a direct voltage source comprising one or more of a photovoltaic panel, a wind generator or a fuel cell is provided across the first and second connections.

7. A method of operating a multi-level DC/AC converter for converting a variable input DC voltage into an AC output voltage with fixed positive and negative peak values, the converter having first, second, third, fourth, fifth and sixth connecting branches arranged in parallel; first, second, third and fourth capacitors coupled in series; and first, second, third and fourth controlled switches coupled in series,
   wherein: the first capacitor is coupled on a first end to the first connecting branch,
      the first and second capacitors are coupled together at the second connecting branch,
      the second and third capacitors are coupled together at a neutral node and further to the third and fourth connecting branches,
      the third capacitor and a first end of the fourth capacitor are coupled together at the fifth connecting branch, and
      a second end of the fourth capacitor is coupled to the sixth connecting branch;
   further wherein: the first controlled switch is coupled on a first end to the first connecting branch,
      the first and second controlled switches are coupled together at the second connecting branch,
      the second and third controlled switches are coupled together at an output node of the converter and further to the third and fourth connecting branches, the third controlled switch and a first end of the fourth controlled switch are coupled together at the fifth connecting branch, and a second end of the fourth controlled switch is coupled to the sixth connecting branch;

the method comprising:

applying a variable DC voltage from a DC source, one half of the variable DC voltage applied across the second capacitor and defining a positive limit voltage and one half of the variable DC voltage applied across the third capacitor and defining a negative limit voltage;

generating a voltage across the first capacitor corresponding to a difference between the fixed positive peak value and the variable positive limit value;

generating a voltage across the fourth capacitor corresponding to a difference between the fixed negative peak value and the variable negative limit value; and driving the first, second, third and fourth controlled switches by PWM driving signals having variable duty cycle in such a way that:

output voltage values between the positive limit value and the negative limit value are generated by switching the second and third controlled switches complementarily while the first and fourth controlled switches are kept opened;

output voltage values exceeding the positive limit value are generated switching the first controlled switch, while the second controlled switch is kept closed and the third and fourth controlled switches are kept opened; and output voltage values below the negative limit value are generated switching the fourth controlled switch, maintaining the third controlled switch closed and the first and second controlled switches opened.

8. The method of claim 7, wherein a variable DC voltage from a direct voltage source comprising one or more of a photovoltaic panel, a wind generator or a fuel cell is provided across the first and second capacitors.

* * * * *